(12) United States Patent
Huang

(10) Patent No.: US 11,195,251 B1
(45) Date of Patent: Dec. 7, 2021

(54) IMAGE PROCESSING APPARATUS AND METHOD CAPABLE OF RAPIDLY DETERMINING BOUNDING BOX FOR MOTION OBJECTS WITHOUT ITERATION

(71) Applicant: HIMAX TECHNOLOGIES LIMITED, Tainan (TW)

(72) Inventor: Tsung-Yau Huang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/953,299

(22) Filed: Nov. 19, 2020

(51) Int. Cl.
  *G06T 1/60* (2006.01)
  *G06T 1/20* (2006.01)
  *G06T 7/00* (2017.01)
  *G06T 1/00* (2006.01)

(52) U.S. Cl.
  CPC .............. *G06T 1/60* (2013.01); *G06T 1/0007* (2013.01); *G06T 1/20* (2013.01); *G06T 7/97* (2017.01); *G06T 2210/12* (2013.01)

(58) Field of Classification Search
  CPC ........... G06T 1/60; G06T 7/97; G06T 1/0007; G06T 1/20; G06T 2210/12
  See application file for complete search history.

(56) References Cited

U.S. PATENT DOCUMENTS

| | | | | |
|---|---|---|---|---|
| 2005/0135479 A1* | 6/2005 | Lee | ........................ | H04N 19/61 |
| | | | | 375/240.12 |
| 2011/0142132 A1* | 6/2011 | Tourapis | ................ | H04N 19/46 |
| | | | | 375/240.16 |
| 2018/0199054 A1* | 7/2018 | Hsu | ....................... | H04N 19/105 |
| 2019/0045192 A1* | 2/2019 | Socek | .................... | H04N 19/80 |
| 2020/0374491 A1* | 11/2020 | DeAngelus | ............ | H04N 7/188 |

* cited by examiner

*Primary Examiner* — David T Welch

(74) *Attorney, Agent, or Firm* — Winston Hsu

(57) ABSTRACT

An image processing method includes: receiving a raw input image; converting the raw input image into a binary input image; dividing the binary input image into N×M blocks; determining whether a specific block is a moving block; determining whether the specific block is a connected image component which is connected to at least one corresponding neighboring block when the specific block is determined as the moving block; and, determining a bounding box according to a result of whether the specific block is the connected image component connected to at least one corresponding neighboring block.

14 Claims, 3 Drawing Sheets

IMAGE PROCESSING APPARATUS AND METHOD CAPABLE OF RAPIDLY DETERMINING BOUNDING BOX FOR MOTION OBJECTS WITHOUT ITERATION

BACKGROUND OF THE INVENTION

1. Field of the Invention

The invention relates to an image processing scheme, and more particularly to an image processing apparatus and corresponding method capable of rapidly determining bounding box(es) for motion object(s) without iteration.

2. Description of the Prior Art

Generally speaking, a conventional image processing method inevitably needs to scan a single image/frame for multiple times with computation iteration so as to calculate a bounding box region for a complete motion object. Due to the computation iteration, the hardware implementation is not easy, and the conventional image processing method usually uses the pure software programs to calculate the bounding box region. Even though the hardware implementation can be achieved, however, this introduces significant hardware circuit costs. Further, the conventional image processing method may erroneously mark a complete object as multiple unconnected image components due to image noise.

SUMMARY OF THE INVENTION

Therefore one of the objectives of the invention is to provide an image processing method and image processing apparatus, to solve the above-mentioned problems.

According to embodiments of the invention, an image processing method is disclosed. The method comprises: receiving a raw input image; converting the raw input image into a binary input image having pixels each having a pixel value, a value of a pixel is marked as a first bit if the pixel is a moving pixel associated with motion; dividing the binary input image into N×M blocks, wherein N and M are integers; for a specific block: determining whether the specific block is a moving block; and determining whether the specific block is a connected image component which is connected to at least one corresponding neighboring block when the specific block is determined as the moving block; and determining a bounding box according to a result of whether the specific block is the connected image component connected to at least one corresponding neighboring block. The step of determining whether the specific block is a connected image component comprises: calculating a pixel distance between a boundary defined by at least one moving pixel within the specific block and a boundary defined by at least one moving pixel within the at least one corresponding neighboring block; determining that the specific block is labeled as a connected image component which is connected to the at least one corresponding neighboring block when the pixel difference is smaller than a specific threshold distance; and determining that the specific block is not labeled as the connected image component when the pixel difference is not smaller than the specific threshold distance According to the embodiments, an image processing apparatus is disclosed. The apparatus comprises a motion detection circuit and a processing circuit. The motion detection circuit is used for receiving a raw input image and for converting the raw input image into a binary input image having pixels each having a pixel value, a value of a pixel is marked as a first bit if the pixel is a moving pixel associated with motion. The processing circuit is coupled to the motion detection circuit, and is used for dividing the binary input image into N×M blocks, wherein N and M are integers; the processing is used for: determining whether a specific block is a moving block; determining whether the specific block is a connected image component which is connected to at least one corresponding neighboring block when the specific block is determined as the moving block; and determining a bounding box according to a result of whether the specific block is the connected image component connected to at least one corresponding neighboring block. The processing circuit is arranged for: calculating a pixel distance between a boundary defined by at least one moving pixel within the specific block and a boundary defined by at least one moving pixel within the at least one corresponding neighboring block; determining that the specific block is labeled as a connected image component which is connected to the at least one corresponding neighboring block when the pixel difference is smaller than a specific threshold distance; and determining that the specific block is not labeled as the connected image component when the pixel difference is not smaller than the specific threshold distance.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution and method capable of more rapidly calculating bounding box(es) for foreground (moving) pixels/images based on a low-cost computation algorithm without iteration. More specifically, the provided technical solution and method can be implemented by using a line-based algorithm, and no iterations are needed since all operations associated with the line-based algorithm can be executed and finished based on one raster scanning scheme. Thus, this reduces the computation cost and the data buffer cost as well as simplifies the implementation of hardware circuits. In addition, the technical solution and method provides an anti-noise processing scheme to avoid separating a complete image object into several discrete broken (unconnected) images. In addition, the technical solution and method provides a pipe-line processing scheme to reduce the latency.

Figure 1:
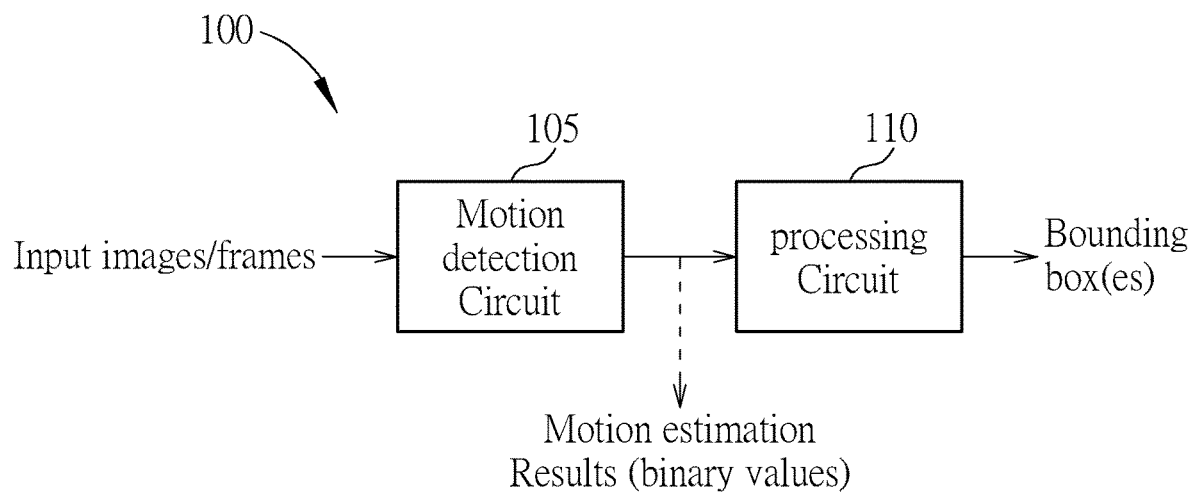
FIG. 1 is a block diagram of an image processing apparatus according to an embodiment of the invention.

FIG. 1 is a block diagram of an image processing apparatus 100 according to an embodiment of the invention. As shown in FIG. 1, the image processing apparatus 100 comprises a motion detection circuit 105 and a processing circuit 110. The image processing apparatus 100 is used for receiving input images/frames to generate one or more bounding boxes for moving/foreground image object(s) in the input images.

For one or each pixel (or pixel unit) within one or each image/frame, the motion detection circuit 105 generates a motion estimation of one or each pixel so as to generate a plurality of motion estimations of a plurality of pixels, and it outputs the motion estimations to the processing circuit 110 to indicate which pixels are associated with motion and which pixels are not associated with motion. For instance, the motion detection circuit 105 may generate a binary image/frame to indicate which pixels in such image/frame are associated with motion and which pixels are not associated with motion. In practice, in this embodiment, the motion detection circuit 105 is arranged to receive raw/original input images/frames, perform motion estimation operation upon the raw/original input images/frames, and to generate binary input images/frames based on the motion estimation results. That is, the motion detection circuit 105 is used to convert the raw/original input images/frames into the binary input images/frames. For each pixel (or pixel unit) of each image/frame, the motion detection circuit 105 detects motion of the each pixel to generate a motion estimation result of the each pixel. The motion detection circuit 105 is arranged to use a first bit such as '1' to replace the original pixel value of the each pixel when the motion estimation result indicates that the each pixel is a moving pixel, i.e. motion occurs. The motion detection circuit 105 is arranged to use a second bit such as '0' to replace the original pixel value of the each pixel when the motion estimation result indicates that the each pixel is a non-moving pixel, i.e. no motion occurs. Accordingly, after processing all pixels of a raw/original image/frame, the motion detection circuit 105 can generate and output a binary input image/frame to the processing circuit 110 in the next circuit stage. It should be noted that a moving pixel in a binary image/frame may be considered as a foreground pixel while a non-moving pixel may be considered as a background pixel; however, this is not intended to be a limitation. Further, in other embodiments, if an input image/frame received by the motion detection circuit 105 is a binary image/frame, the motion detection circuit 105 can directly pass and output the received binary image/frame to the processing circuit 110.

One or each raw/binary input image/frame having W×H pixels (W columns and H rows) is separated or divided/classified by the image processing apparatus 100 into a plurality of blocks each including N×M pixels wherein W, H, N, and M are integers. N may be identical to or different from M; this is not intended to be a limitation. Accordingly, one or each input image/frame is separated by the image processing apparatus 100 into $$\frac{W}{N} \times \frac{H}{M}$$

bins. For example, an image having 8×4 pixels may be separated into 2×1 bins by using the block size having 4×4 pixels. The moving/foreground pixels in the same block/bin are considered as connected image components/portions which are associated with a single complete image object. In practice, the classification operation mentioned above can be performed upon the binary input image/frame by the processing circuit 110. That is, when receiving the binary input image/frame having W×H pixels each being associated with bit '1' or bit '0' is separated or divided by the processing circuit 110 into a plurality of blocks each including N×M pixels wherein W, H, N, and M are integers. N may be identical to or different from M. One or each input image/frame is separated into W/N×H/M bins by the processing circuit 110.

Based on the motion estimation results (i.e. binary values) generated from the motion detection circuit 105, the processing circuit 110 can know which pixels are associated with motion and which pixels are still (not associated with motion). For a specific block (or each block) mentioned above, the processing circuit 110 is arranged to perform a statistic operation upon the binary values of pixels within the specific block to calculate or count the total number of moving pixels within the specific block and the total number of non-moving pixels within the specific block. The processing circuit 110 compares the total number of moving pixels with a specific number threshold TH_N to determine whether the specific block is a moving block. If the total number of moving pixels is larger than the specific number threshold TH_N, then the specific block is considered and classified into a moving block. If the total number of moving pixels is not larger than the specific number threshold TH_N, then the specific block is considered and classified into a non-moving block. This classification effectively improves performance of image processing since it avoids the degradation caused due to the image noise.

When the specific block is determined as a moving block, the processing circuit 110 is arranged to determine whether the specific block is a connected image component which has an image connected to image(s) of one or more corresponding neighbor moving blocks. For example, if a neighboring block of the specific block is a moving block, then the processing circuit 110 is arranged to calculate or detect the distance (i.e. pixel distance) between the boundary of the moving image(s) of the specific block and the boundary of the moving image(s) of such neighboring block and then to compare the calculated distance with a specific distance threshold TH_D to determine whether the specific block is connected to such neighboring block. Thus, the processing circuit 110 can calculate or update the bounding box (or referred to as bounding box region) associated with the specific block and neighboring moving block(s) based on the result of whether the specific block is a connected image component connected to the image component(s) of the neighboring moving block(s). The specific distance threshold TH_D may be a pixel distance threshold which can be configured as a pixel-based width/height, i.e. the number of horizontal/vertical pixels. However, this is not intended to be a limitation.

Figure 2:
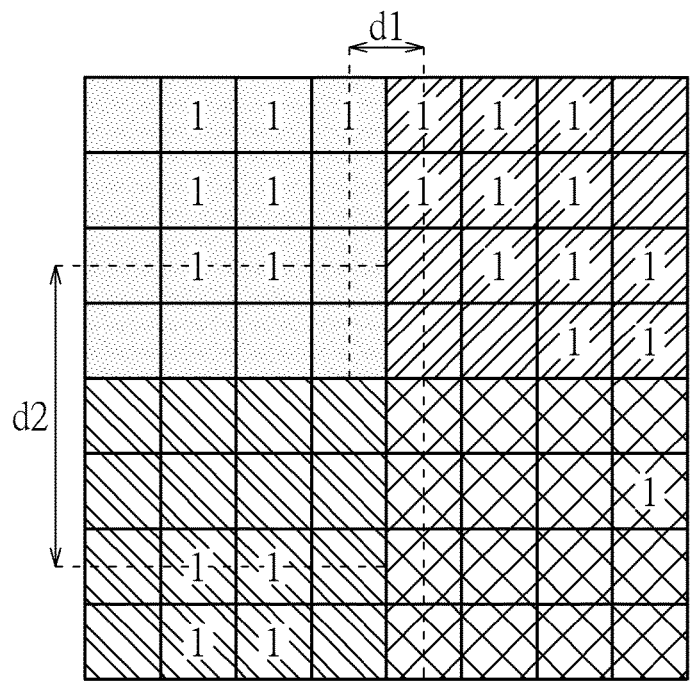
FIG. 2 is a diagram showing an example of the operations of processing circuit for determining whether a block is a moving block and determining whether a moving block has a connected image component according to an embodiment of the invention.

FIG. 2 shows an example of the operations of processing circuit 110 for determining whether a block is a moving block and determining whether a moving block has a connected image component according to an embodiment of the invention. As shown in FIG. 2, the binary input image/frame may comprise 8×8 pixels which are classified into four separated and different blocks based on the block size having 4×4 pixels, i.e. the upper-left block, upper-right block, lower-left block, and the lower-right block. For example, the upper-left block comprises seven moving/foreground pixels which are indicated by bit '1' and the other non-moving/background pixels which are indicated by bit '0' (not shown for brevity); the upper-right block comprises eleven moving/foreground pixels which are indicated by bit '1' and the other non-moving/background pixels which are indicated by bit '0' (not shown for brevity); the lower-left block comprises four moving/foreground pixels which are indicated by bit '1' and the other non-moving/background pixels which are indicated by bit '0' (not shown for brevity); the lower-right block comprises only one moving/foreground pixel which is indicated by bit '1' and the other non-moving/background pixels which are indicated by bit '0' (not shown for brevity). In the example, all the total numbers of moving/foreground pixels respectively within the upper-left, upper-right, and lower-left blocks are larger than the specific number threshold TH_N, and only the number of moving/foreground pixel(s) within the lower-right block is smaller than the specific number threshold TH_N. The processing circuit 110 thus can determine that the upper-left, upper-right, and lower-left blocks are moving blocks while the lower-right block is a non-moving block. Then, the processing circuit 110 determines whether the image portions/components within the upper-left, upper-right, and lower-left blocks are connected. For example, the specific distance threshold TH_D is configured as four; however, this is not intended to be a limitation. In the example, the distance d1 (i.e. the shortest distance) between the boundary of (defined by) moving pixels within the upper-left block and the boundary of (defined by) moving pixels within the upper-right block is equal to one which is not larger than the specific distance threshold TH_D, and thus the processing circuit 110 can determine that the upper-right block is a connected image component which is connected to image of at least one corresponding neighbor block such as the upper-left block once the upper-right block is determined as a moving block by the processing circuit 110. The distance d2 (i.e. shortest distance) between the boundary of (defined by) moving pixels within the lower-left block and the boundary of (defined by) moving pixels within the upper-left block is equal to four which is equal to (not smaller than) the specific distance threshold TH_D, and thus the processing circuit 110 may determine that the lower-left block is not a connected image component once the lower-left block is determined as a moving block by the processing circuit 110.

Figure 3:
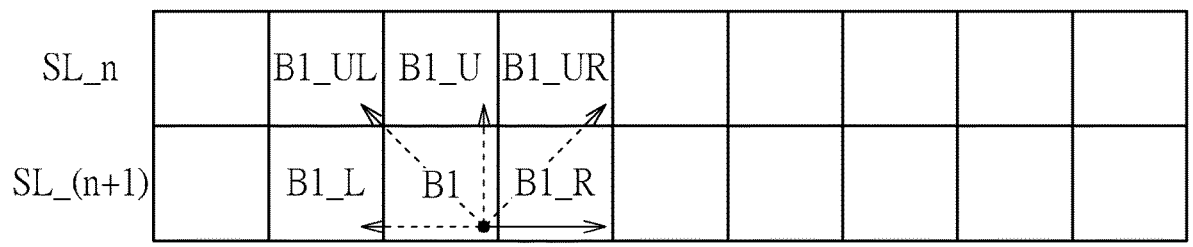
FIG. 3 is a diagram showing a concept example of the line-based algorithm employed by the processing circuit to determine whether one block is a moving block and whether the block is a connected image component according to an embodiment of the invention.

FIG. 3 is a diagram showing a concept example of the line-based algorithm employed by the processing circuit 110 to determine whether one block is a moving block and whether the block is a connected image component according to an embodiment of the invention. The line-based algorithm is executed based on the raster scanning to sequentially scan all blocks; that is, the blocks arranged in the same row or scan line SL_n are sequentially scanned and processed by the processing circuit 110 from the left to the right, and after the blocks in the scan line SL_n are completely processed then blocks arranged in the next row or scan line SL (n+1) are sequentially scanned and processed by the processing circuit 110 from the left to the right. The dotted arrows from the block B1 pointing the blocks B1_L, B1_UL, B1_U, and B1_UR respectively mean that the processing circuit 110 is arranged to determine whether the block B1 has a connected image component which is connected to the image(s) of block(s) B1_L, B1_UL, B1_U, and B1_UR when the block B1 is determined as a moving block. The solid arrow from the block B1 pointing the block B1_R means that the block B1_R is a next block which will be processed by the processing circuit 110 after the operations of processing circuit 110 executed upon the block B1 are completed finished. Thus, when all blocks of all lines within a binary input image/frame has been completely scanned, the processing circuit 110 can obtain the resultant bounding box(es), and no iterations are needed to process the binary input image/frame again. The value of n may ranges from one to the total number of scan lines minus one.

Figure 4:
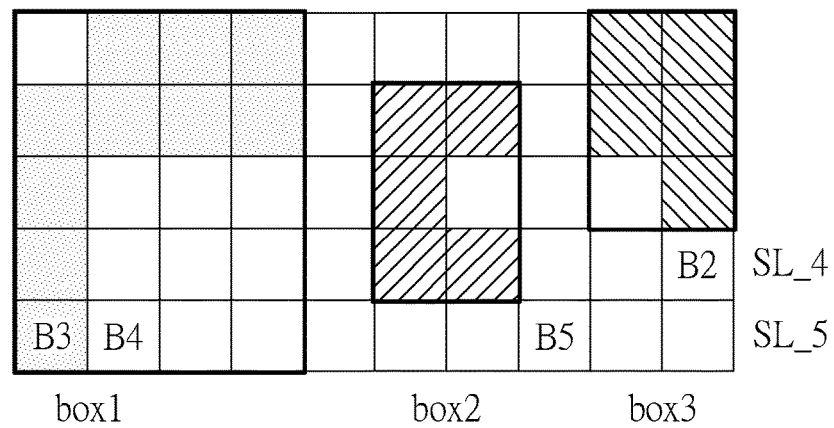
FIG. 4 is a diagram showing an example of the bounding boxes determined by the processing circuit according to an embodiment of the invention.

FIG. 4 is a diagram showing an example of the bounding boxes determined by the processing circuit 110 according to an embodiment of the invention. As shown in FIG. 4, a binary input image/frame comprises 10×5 blocks (but not limited), and the binary input image/frame may comprise three separated moving image objects which are respectively indicated by blocks having dots ('.'), blocks having slashes ('/'), and blocks having backslashes ('\'). The processing circuit 110 can determine the bounding boxes box1, box2, and box3 which respectively cover the blocks having dots ('.'), blocks having slashes ('/'), and blocks having backslashes ('\'). It should be noted that, the information of the results of the bounding boxes box1, box2, and box3 can be determined and outputted by different portions of hardware circuits or different portions of hardware and software combinations of the processing circuit 110 based on the pipeline scheme. For example, when the block B2 (i.e. the block on the far right of the fourth scan line SL_4) has been scanned and determined as a non-moving block by the processing circuit 110, a first portion/circuit of the processing circuit 110 can determine the resultant information of the bounding box box3. Then, a second portion/circuit of processing circuit 110 can output and transmit the resultant information (e.g. coordinate values) of the bounding box box3 to a circuit at the next stage, and simultaneously the first portion/circuit of the processing circuit 110 may scan the block on the far left of the fifth scan line SL_5, i.e. block B3, to determine that the block B3 as a moving block and also has a connected image component so as to update the information of the bounding box box1. That is, the processing circuit 110 can output the resultant information of a bounding box and simultaneously update the information of another different bounding box. Further, in the example, the resultant information of the bounding box box1 can be determined and ready to be outputted when the block B4 on the last scan line (i.e. the fifth scan line SL_5) is determined as a non-moving block or is determined as a unconnected image component (in other examples). The resultant information of the bounding box box2 can be determined and ready to be outputted when the block B5 on the last scan line (i.e. the fifth scan line SL_5) is determined as a non-moving block or is determined as a unconnected image component (in other examples).

Figure 5:
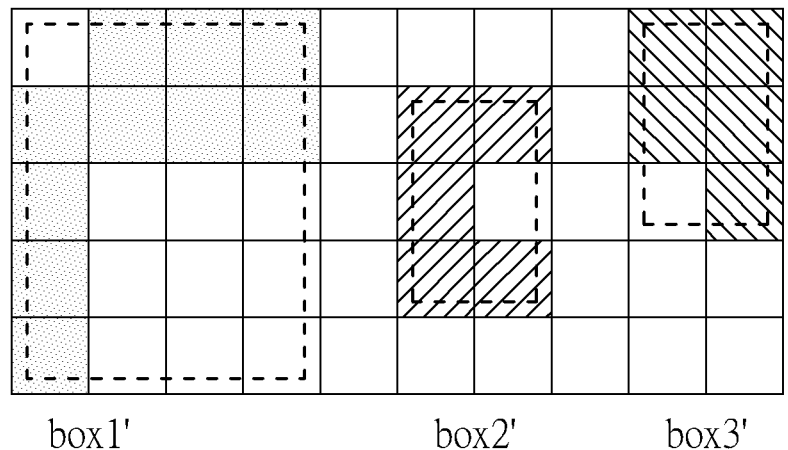
FIG. 5 is a diagram showing an example of the bounding boxes determined by the processing circuit based on coordinate values of moving pixels according to another embodiment of the invention.

In the example of FIG. 4, the processing circuit 110 is arranged to determine the resultant information (e.g. the left and right coordinate values of X-axis and the top and bottom coordinate values of Y-axis) of a bounding box by coordinate values of moving blocks. However, this is not intended to be a limitation. In other embodiments, the processing circuit 110 may be arranged to determine the resultant information (e.g. the left and right coordinate values of X-axis and the top and bottom coordinate values of Y-axis) of a bounding box by coordinate values of moving pixels within moving blocks. FIG. 5 is a diagram showing an example of the bounding boxes determined by the processing circuit 110 based on coordinate values of moving pixels according to another embodiment of the invention. As shown in FIG. 5, the processing circuit 110 may determine the resultant information of the bounding boxes box1', box2', and box3' for the moving blocks similarly shown in the example of FIG. 4. The bounding boxes box1', box2', and box3' determined based on the coordinate values of moving pixels can be smaller than the bounding boxes box1, box2, and box3 determined based on the coordinate values of moving blocks, and can be more effectively and accurately used to track moving image object(s).

Figure 6:
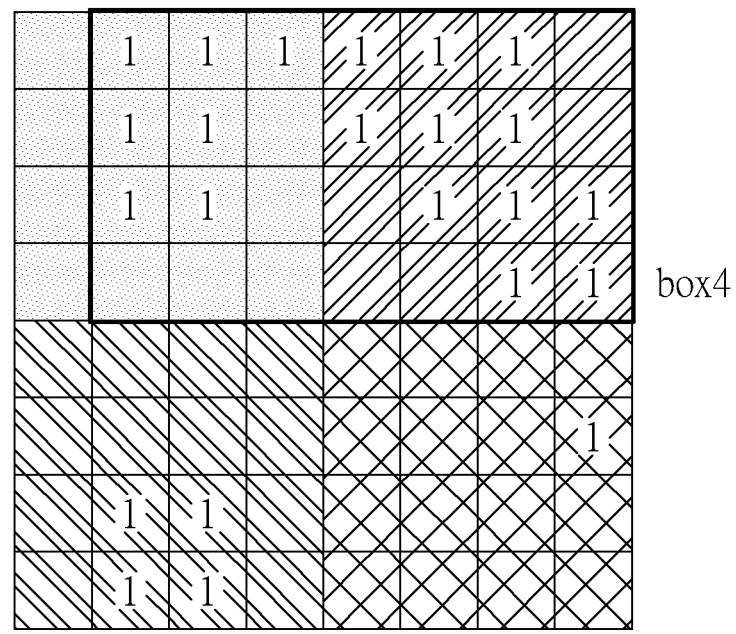
FIG. 6 is a diagram showing an example of a bounding box determined based on the coordinate values of moving pixels according to the embodiment of FIG. 2.

FIG. 6 is a diagram showing an example of a bounding box determined based on the coordinate values of moving pixels according to the embodiment of FIG. 2. As shown in FIG. 6, the processing circuit 110 determines that the upper-left, upper-right, and lower-left blocks are moving blocks, and the upper-left and upper-right blocks are connected image components. The processing circuit 110 may determine and generate the bounding box box4 shown in FIG. 6 based on the coordinate values of moving pixels respectively within the upper-left and upper-right blocks so as to closely cover all the moving pixels (indicated by bit '1') of the upper-left and upper-right blocks. This example is used for illustrative and is not intended to be a limitation.

Refer back to FIG. 3 again. In practice, in one embodiments, only two memory circuits are needed for the processing circuit 110 to record/store the old information of determined bounding boxes respectively for the previous scan line SL_n and the updated information of the bounding boxes for the current/next scan line SL (n+1). For example, a first memory circuit table can be implemented as a first table to be employed to record or store the coordinate values of the bounding box(es) associated with the first scan line SL_1 when the processing circuit 110 scans a first scan line such as SL_1 (not shown in FIG. 3). Then, when the processing circuit 110 scans a second scan line such as SL_2 (not shown in FIG. 3), a second memory circuit table can be implemented as a second table to be employed to record or store the coordinate values of the bounding box(es) which has/have been updated by the processing circuit 110 based on the information of moving blocks on the second scan line SL_2 and the coordinate values previously recorded in the first table. Thus, in this situation, the second table records or stores the coordinate values of the bounding box(es) associated with the scan lines SL_1 and SL_2. Then the first table is cleared and used to record the updated coordinate values of the bounding box (es) which has/have been updated by the processing circuit 110 based on the information of moving blocks on the third scan line SL_3 and the coordinate values previously recorded in the second table. Thus, similarly, one among the first and second tables is used to record the updated coordinate values of the bounding box(es) which has/have been updated by the processing circuit 110 based on the information of moving blocks on the scan line SL (n+1) and the coordinate values associated with scan lines from SL_1 to SL_n previously recorded in the other table. Compared to the conventional scheme, the invention can significantly save the hardware circuit costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
receiving a raw input image;
converting the raw input image into a binary input image having pixels each having a pixel value, a value of a pixel is marked as a first bit if the pixel is a moving pixel associated with motion;
dividing the binary input image into N×M blocks, wherein N and M are integers;
for a specific block:
determining whether the specific block is a moving block; and
determining whether the specific block is a connected image component which is connected to at least one corresponding neighboring block when the specific block is determined as the moving block; and
determining a bounding box according to a result of whether the specific block is the connected image component connected to at least one corresponding neighboring block;
wherein the step of determining whether the specific block is a connected image component comprises:
calculating a pixel distance between a boundary defined by at least one moving pixel within the specific block and a boundary defined by at least one moving pixel within the at least one corresponding neighboring block;
determining that the specific block is labeled as a connected image component which is connected to the at least one corresponding neighboring block when the pixel difference is smaller than a specific threshold distance; and
determining that the specific block is not labeled as the connected image component when the pixel difference is not smaller than the specific threshold distance.

2. The image processing method of claim 1, wherein the step of determining whether the specific block is a moving block comprises:
determining the specific block is the moving block when a number of moving pixels within the specific block is larger than a specific number threshold; and
determining the specific block is a non-moving block when the number of moving pixels within the specific block is not larger than the specific number threshold.

3. The image processing method of claim 1, further comprising:
configuring a pixel-based width/height as the specific threshold distance.

4. The image processing method of claim 1, wherein the step of determining whether the specific block is a moving block and the step of determining whether the specific block is a connected image component are performed based on a raster scanning scheme to sequentially scan all blocks of the binary input image, and the step of determining the bounding box is performed to sequentially update coordinate values of the bounding box.

5. The image processing method of claim 1, further comprising:
simultaneously outputting resultant coordinate values of another bounding box when the step of determining the bounding box is performed to sequentially update coordinate values of the bounding box.

6. The image processing method of claim 1, wherein the step of determining the bounding box comprises:
  determining coordinate values of the bounding box according to coordinate values of the specific block and coordinate values of at least one corresponding neighboring block when the specific block is the connected image component.

7. The image processing method of claim 1, wherein the step of determining the bounding box comprises:
  determining coordinate values of the bounding box according to coordinate values of a boundary of moving pixels within the specific block and coordinate values of a boundary of moving pixels within at least one corresponding neighboring block when the specific block is the connected image component.

8. An image processing apparatus, comprising:
  a motion detection circuit, for receiving a raw input image and converting the raw input image into a binary input image having pixels each having a pixel value, a value of a pixel is marked as a first bit if the pixel is a moving pixel associated with motion; and
  a processing circuit, coupled to the motion detection circuit, for dividing the binary input image into N×M blocks, wherein N and M are integers; and for a specific block:
    determining whether the specific block is a moving block;
    determining whether the specific block is a connected image component which is connected to at least one corresponding neighboring block when the specific block is determined as the moving block; and
    determining a bounding box according to a result of whether the specific block is the connected image component connected to at least one corresponding neighboring block;
  wherein the processing circuit is arranged for:
    calculating a pixel distance between a boundary defined by at least one moving pixel within the specific block and a boundary defined by at least one moving pixel within the at least one corresponding neighboring block;
    determining that the specific block is labeled as a connected image component which is connected to the at least one corresponding neighboring block when the pixel difference is smaller than a specific threshold distance; and
    determining that the specific block is not labeled as the connected image component when the pixel difference is not smaller than the specific threshold distance.

9. The image processing apparatus of claim 8, wherein the processing circuit is arranged for:
  determining the specific block is the moving block when a number of moving pixels within the specific block is larger than a specific number threshold; and
  determining the specific block is a non-moving block when the number of moving pixels within the specific block is not larger than the specific number threshold.

10. The image processing apparatus of claim 8, wherein the processing circuit is arranged for configuring a pixel-based width/height as the specific threshold distance.

11. The image processing apparatus of claim 8, wherein the processing circuit is arranged for determining whether the specific block is a moving block and for determining whether the specific block is a connected image component based on a raster scanning scheme to sequentially scan all blocks of the binary input image, and the processing circuit is arranged to sequentially update coordinate values of the bounding box.

12. The image processing apparatus of claim 8, wherein the processing circuit is arranged for simultaneously outputting resultant coordinate values of another bounding box when determining the bounding box to sequentially update coordinate values of the bounding box.

13. The image processing apparatus of claim 8, wherein the processing circuit is arranged for:
  determining coordinate values of the bounding box according to coordinate values of the specific block and coordinate values of at least one corresponding neighboring block when the specific block is the connected image component.

14. The image processing apparatus of claim 8, wherein the processing circuit is arranged for:
  determining coordinate values of the bounding box according to coordinate values of a boundary of moving pixels within the specific block and coordinate values of a boundary of moving pixels within at least one corresponding neighboring block when the specific block is the connected image component.

* * * * *